United States Patent
Williams et al.

(10) Patent No.: US 10,143,346 B2
(45) Date of Patent: Dec. 4, 2018

(54) SEPARATOR FOR REMOVING DIRT PARTICLES FROM AN AIRFLOW

(71) Applicant: Dyson Technology Limited, Wiltshire (GB)

(72) Inventors: Adair George Wilmot Williams, Dorset (GB); David Michael Jones, Gloucester (GB); Ian Ashmore, Swindon (GB); Ricardo Gomiciaga-Pereda, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 81 days.

(21) Appl. No.: 14/919,586

(22) Filed: Oct. 21, 2015

(65) Prior Publication Data
US 2016/0113464 A1  Apr. 28, 2016

(30) Foreign Application Priority Data
Oct. 22, 2014 (GB) .................................. 1418798.3

(51) Int. Cl.
*B01D 45/12* (2006.01)
*A47L 9/16* (2006.01)
(Continued)

(52) U.S. Cl.
CPC .......... *A47L 9/1641* (2013.01); *A47L 9/1683* (2013.01); *B01D 45/14* (2013.01); *B01D 50/00* (2013.01);
(Continued)

(58) Field of Classification Search
CPC ...... A47L 9/1608; A47L 9/1683; A47L 9/102; A47L 9/1675; A47L 9/1641; B04C 9/00;
(Continued)

(56) References Cited

U.S. PATENT DOCUMENTS 1,420,665 A  6/1922 Newcombe
1,664,092 A  3/1928 Squires
(Continued)

FOREIGN PATENT DOCUMENTS

AT          359 031       10/1980
CN          201572689      9/2010
(Continued)

OTHER PUBLICATIONS

Combined Search and Examination Report dated Mar. 31, 2015, directed to GB Application No. 1418798.3; 3 pages.
(Continued)

*Primary Examiner* — Dung H Bui
(74) *Attorney, Agent, or Firm* — Morrison & Foerster LLP (57) ABSTRACT

A separator for removing dirt particles from an airflow, the separator comprising a first separation stage having an impeller, and a second separation stage having one or more cyclone bodies arranged in parallel, the first separation stage being upstream of the second separation stage. The impeller generates the airflow through the separator and concentrates the dirt particles within the airflow to produce a clean portion and a dirty portion of airflow, and wherein only the dirty portion of airflow is passed through the second separation stage.

13 Claims, 3 Drawing Sheets

(51) Int. Cl.
*B01D 45/14* (2006.01)
*B01D 50/00* (2006.01)
*B04C 5/28* (2006.01)
*B04C 9/00* (2006.01)

(52) U.S. Cl.
CPC .................. *B04C 5/28* (2013.01); *B04C 9/00* (2013.01); *A47L 9/1608* (2013.01); *B04C 2009/007* (2013.01); *Y10S 55/03* (2013.01)

(58) Field of Classification Search
CPC ........ B04C 2009/005; B04C 2009/007; B04C 5/28; Y10S 55/03; B01D 50/00; B01D 45/14
See application file for complete search history.

(56) References Cited

U.S. PATENT DOCUMENTS

| | | | |
|---|---|---|---|
| 2,093,082 A | 9/1937 | Karlstrom | |
| 2,224,202 A | 12/1940 | Smellie | |
| 2,392,716 A | 1/1946 | Acheson | |
| 2,520,589 A | 8/1950 | White | |
| 2,767,847 A * | 10/1956 | Russell | B01D 17/0208 210/208 |
| 3,234,716 A * | 2/1966 | Sevin | B01D 45/14 209/710 |
| 3,425,192 A * | 2/1969 | Davis | A47L 9/1625 209/711 |
| 5,350,432 A | 9/1994 | Lee | |
| 5,592,716 A | 1/1997 | Morén et al. | |
| 5,656,050 A | 8/1997 | Moredock | |
| 5,914,416 A | 6/1999 | Thode | |
| 6,110,246 A * | 8/2000 | Eubank | B01D 45/14 55/394 |
| 6,183,641 B1 | 2/2001 | Conrad et al. | |
| 6,319,304 B1 | 11/2001 | Moredock | |
| 6,334,234 B1 * | 1/2002 | Conrad | A47L 5/30 15/347 |
| 6,406,506 B1 | 6/2002 | Moredock et al. | |
| 6,719,830 B2 | 4/2004 | Illingworth et al. | |
| 7,056,368 B2 | 6/2006 | Moredock et al. | |
| 7,070,637 B1 | 7/2006 | Zhang | |
| 8,007,565 B2 | 8/2011 | Moredock | |
| 2002/0088078 A1 * | 7/2002 | Oh | A47L 9/1683 15/327.1 |
| 2002/0095742 A1 * | 7/2002 | Bair | A47L 5/28 15/353 |
| 2003/0106858 A1 | 6/2003 | Elsom Sharpe | |
| 2003/0136094 A1 | 7/2003 | Illingworth et al. | |
| 2003/0150198 A1 * | 8/2003 | Illingworth | A47L 5/24 55/406 |
| 2003/0167741 A1 | 9/2003 | Illingworth et al. | |
| 2004/0103784 A1 * | 6/2004 | Birdwell | B01D 45/14 95/270 |
| 2004/0139709 A1 | 7/2004 | Illingworth et al. | |
| 2006/0107629 A1 | 5/2006 | Oh | |
| 2008/0034717 A1 * | 2/2008 | Yun | B01D 45/14 55/437 |
| 2008/0264017 A1 * | 10/2008 | Oh | A47L 9/1608 55/457 |
| 2009/0025562 A1 * | 1/2009 | Hallgren | B01D 45/14 96/216 |
| 2009/0031525 A1 * | 2/2009 | Makarov | A47L 9/1625 15/347 |
| 2009/0100810 A1 * | 4/2009 | Smith | A47L 9/1625 55/343 |
| 2009/0223188 A1 * | 9/2009 | Oh | A47L 9/00 55/365 |
| 2010/0139033 A1 * | 6/2010 | Makarov | A47L 9/1625 15/353 |
| 2011/0061351 A1 | 3/2011 | Courtney et al. | |
| 2011/0132192 A1 * | 6/2011 | Bates | B01D 45/14 95/28 |
| 2011/0296648 A1 * | 12/2011 | Kah, Jr. | A47L 5/14 15/353 |
| 2012/0042909 A1 | 2/2012 | Studebaker | |
| 2013/0091658 A1 * | 4/2013 | Smith | A47L 9/009 15/347 |
| 2013/0091810 A1 * | 4/2013 | Smith | A47L 9/0081 55/315.2 |
| 2014/0101889 A1 * | 4/2014 | Davidshofer | A47L 9/1608 15/353 |
| 2014/0260135 A1 * | 9/2014 | Dingess | B01D 45/14 55/447 |
| 2016/0100729 A1 * | 4/2016 | Bower | A47L 9/1641 15/353 |
| 2016/0113460 A1 | 4/2016 | Williams et al. | |
| 2016/0113467 A1 * | 4/2016 | Box | A47L 9/1616 15/347 |
| 2016/0114273 A1 | 4/2016 | Williams et al. | |

FOREIGN PATENT DOCUMENTS

| | | | |
|---|---|---|---|
| DE | 742 954 | 11/1944 | |
| DE | 7014721 | 9/1970 | |
| DE | 20 2009 017 053 | 5/2010 | |
| DE | 10 2011 087 453 | 6/2013 | |
| EP | 0 885 585 | 12/1998 | |
| EP | 1 042 980 | 9/2002 | |
| EP | 1 721 652 | 11/2006 | |
| EP | 1721652 A1 * | 11/2006 | A47L 9/1641 |
| EP | 2 030 543 | 3/2009 | |
| EP | 1 644 101 | 12/2009 | |
| EP | 2 332 455 | 6/2011 | |
| EP | 1 653 838 | 9/2012 | |
| EP | 2 456 345 | 12/2012 | |
| FR | 1.058.311 | 3/1954 | |
| FR | 1.063.400 | 5/1954 | |
| FR | 1.464.884 | 1/1967 | |
| FR | 2 902 985 | 1/2008 | |
| GB | 672328 | 5/1952 | |
| GB | 1 549 535 | 8/1979 | |
| GB | 2 346 075 | 8/2000 | |
| GB | 2346075 A * | 8/2000 | A47L 5/14 |
| JP | 11-3193 | 8/1936 | |
| JP | 48-91669 | 11/1973 | |
| JP | 52-125405 | 10/1977 | |
| JP | 60-187315 | 9/1985 | |
| JP | 61-153167 | 7/1986 | |
| JP | 4-330954 | 11/1992 | |
| JP | 10-24254 | 1/1998 | |
| JP | 3724413 | 12/2005 | |
| JP | 2006-150037 | 6/2006 | |
| JP | 2008-169725 | 7/2008 | |
| JP | 2010-131158 | 6/2010 | |
| JP | 2010-166998 | 8/2010 | |
| JP | 2010-246961 | 11/2010 | |
| JP | 4743245 | 8/2011 | |
| JP | 4937189 | 5/2012 | |
| WO | WO-00/21428 | 4/2000 | |
| WO | WO-02/03845 | 1/2002 | |
| WO | WO-2007/120535 | 10/2007 | |
| WO | WO-2007/132142 | 11/2007 | |
| WO | WO-2009/144257 | 12/2009 | |
| WO | WO-2013/189871 | 12/2013 | |

OTHER PUBLICATIONS

International Search Report and Written Opinion dated Dec. 7, 2015, directed to International Application No. PCT/GB2015/052727; 9 pages.

Williams et al., U.S. Office Action dated Oct. 12, 2017, directed to U.S. Appl. No. 14/919,595; 8 pages.

Williams et al., U.S. Office Action dated Dec. 6, 2017, directed to U.S. Appl. No. 14/919,581; 9 pages.

Williams et al., U.S. Office Action dated Jun. 5, 2017, directed to U.S. Appl. No. 14/919,581; 10 pages.

(56) References Cited

OTHER PUBLICATIONS

Williams et al., U.S. Office Action dated May 26, 2017, directed to U.S. Appl. No. 14/919,595; 12 pages.

* cited by examiner

SEPARATOR FOR REMOVING DIRT PARTICLES FROM AN AIRFLOW

REFERENCE TO RELATED APPLICATION

This application claims priority of United Kingdom Application No. 1418798.3, filed on Oct. 22, 2014, the entire contents of which are incorporated herein by reference.

FIELD OF THE INVENTION

The present invention relates to a separator for removing particles from an airflow.

BACKGROUND OF THE INVENTION

It is well known to separate particles, such as dirt and dust particles, from a fluid flow using a cyclonic separator. Known cyclonic separators are used in vacuum cleaners, for example, and have been known to comprise a low efficiency cyclone for separating fluff and relatively large particles, and a high efficiency cyclone located downstream of the low efficiency cyclone for separating the fine particles which remain entrained within the airflow. It is also known to provide an upstream cyclonic separator in combination with a plurality of smaller, downstream cyclone bodies, the downstream cyclone bodies being arranged in parallel with one another. An arrangement of this type is shown and described in U.S. Pat. No. 3,425,192.

In vacuum cleaner applications, particularly in domestic vacuum cleaner applications, it is desirable for the appliance to be made as compact as possible without compromising the cleaning performance of the appliance. It is also desirable for the efficiency and performance of the separation apparatus contained within the appliance to be as high as possible (i.e. to separate as high a proportion as possible of very fine dust particles from the airflow). In addition, it is desirable for vacuum cleaners to be as energy efficient as possible, without compromising cleaning performance. This is particularly the case for battery powered vacuum cleaners, for example handheld or robot vacuum cleaners. A typical method of increasing the separation performance and efficiency of a cyclonic separator is to decrease the size of the downstream cyclone bodies. Making the cyclone bodies smaller increases the centrifugal forces within the cyclone body, and therefore improving separation of the dust and dirt from the airflow. However, decreasing the size cyclone bodies also reduces the volume of air that each cyclone body can handle. To overcome this, additional cyclone bodies are provided to maintain the desired airflow, and to stop a bottleneck being created at the downstream cyclone stage. For example, the cyclonic separator on a Dyson DC59 handheld vacuum cleaner has a secondary cyclone stage that contains fifteen small cyclone bodies in parallel in order to provide the desired separation performance. Indeed, some cyclonic separators are known to contain up to fifty-four small cyclone bodies in parallel, such as on the Dyson DC54 cylinder vacuum cleaner. However, increasing the number of smaller cyclone bodies will also result in an increase in size for the separator, and therefore the overall machine. Furthermore, the energy required to pass airflow through multiple small cyclone bodies is significant, and in the case of battery powered vacuum cleaners this can have a detrimental effect on battery life.

SUMMARY OF THE INVENTION

This invention provides a separator for removing dirt particles from an airflow, the separator comprising a first separation stage having an impeller, and a second separation stage having one or more cyclone bodies arranged in parallel, wherein the first separation stage is upstream of the second separation stage, the impeller generates the airflow through the separator and generates swirl within the airflow in the first separation stage, the swirl throws the dirt particles radially outwards to produce an outer dirty portion and an inner clean portion of airflow, and wherein the dirty portion of airflow passes through the second separation stage, and the clean portion of airflow bypasses the second separation stage.

As a result, a smaller volume of air is required to pass through the second separation stage. The air that passes through the second separation stage is a fraction of the overall total volume of air that passes through the separator. As such, fewer cyclone bodies are required in the second separation stage to achieve the required separation performance. This allows the overall size of the separator to be kept as small as possible, which is desirable for any vacuum cleaner but particularly important if the separator is used in a handheld vacuum cleaner or a robot vacuum cleaner. What is more, as air passes through fewer small cyclone bodies, less energy is required by the second separation stage compared to a vacuum cleaner that contains a large number of small cyclone bodies. Accordingly, the energy efficiency of a machine containing the separator can be increased, and in the case of a battery powered machine, the battery life can be extended.

The first separation stage may comprise a first outlet and a second outlet. The dirty portion of airflow may exit the first separation stage via the first outlet and the clean portion of airflow may exit the first separation stage via the second outlet. As a result, it may be possible to handle each portion of air differently as it leaves the first separation stage.

The clean portion of airflow may be free from at least 95% of all the dirt particles that enter the separator. As a result, the clean portion of air may be discharged from the separator without needing to be passed through any further separation stages.

The dirty portion of airflow may comprise between 5% and 25% of the total airflow that enters the separator, and the clean portion of airflow may comprise between 75% and 95% of the total airflow that enters the separator. As a result, only a relatively small proportion of the overall total airflow is passed through the second separation stage and so less energy is required at the second separation stage. Furthermore, the number of cyclone bodies provided at the second separation stage can be reduced.

The separator may comprise an initial separation stage upstream of the first separation stage, the initial separation stage removing larger dirt particles and debris from the airflow. As a result, any larger dirt particles or debris that could block or clog the first and second separation stages can be removed from the airflow prior to it entering the first separation stage. The initial separation stage may comprise a cyclone chamber through which the airflow passes before proceeding to the first separation stage.

The first separation stage may comprise a motor for driving the impeller. By incorporating the motor into the first separation stage, the overall size of the separator may be reduced. The motor may also benefit from improved cooling by being located within the first separation stage along with the impeller which generates the airflow through the separator.

The motor may rotate the impeller at speeds above 60 krpm. Rotating the impeller at high speeds will allow the size of the impeller to be kept down, whilst still providing the desired level of airflow. In addition, rotating the impeller fast can result in the dirt particles being concentrated into a smaller portion of the airflow. Therefore the dirty portion of airflow will be reduced in volume, and the airflow load on the second separation stage is reduced.

This invention further provides a method of removing dirt particles from an airflow, the method comprising in a first separation stage, using an impeller to generate the airflow and swirl within the airflow, the swirl throwing the dirt particles radially outwards to produce an outer dirty portion and an inner clean portion of airflow, passing the dirty portion of airflow through a second separation stage having one or more cyclone bodies arranged in parallel, and the clean portion bypassing the second separation stage.

As a result, a more energy efficient method of removing dirt particles from an airflow can be achieved. In particular, the impeller that is used to generate the airflow is also used in the first separation stage to remove dirt particles from a portion of the airflow, and so more energy provided to the impeller is utilised. In addition, the second separation stage is only required to separate dirt particles from a relatively small proportion of the total airflow, and so less energy is required at the second separation stage, making the overall system more energy efficient.

The method may further comprise splitting the dirty portion of airflow from the clean portion of airflow in the first separation stage downstream of the impeller. The clean portion of airflow may be passed through a turbine section to recapture energy from the clean portion of airflow. Accordingly, energy contained within the clean portion of air is not wasted, and the overall energy used is reduced, thus achieving a more energy efficient method of removing dirt particles from an airflow.

The method may comprise driving the impeller at above 60 krpm using a motor. As a result, the desired airflow rate and level of dirt particle concentration can be achieved.

The method may further comprise passing the airflow through an initial separation stage upstream of the first separation stage to remove larger dirt particles and debris from the airflow. This would remove any larger dirt particles or debris that could block or clog the first and second separation stages from the airflow prior to it entering the first separation stage.

This invention further provides a vacuum cleaner comprising a separator as described in any of the preceding statements.

This invention further provides a vacuum cleaner comprising an impeller for generating an airflow through the vacuum cleaner, and a cyclonic separation stage downstream of the impeller, the cyclonic separator having one or more cyclone bodies arranged in parallel for removing dirt particles from an airflow, wherein the impeller generates swirl within the airflow, the swirl throws dirt particles entrained within the airflow radially outwards to produce an outer dirty portion of airflow and an inner clean portion of airflow, and only the dirty portion of airflow is passed through the cyclonic separation stage, such that between only 5% and 25% of the total airflow passes through the cyclonic separation stage for all dirt particles to be removed from the total airflow.

Also described herein is an apparatus for separating particles from an airflow, the apparatus comprising a housing comprising an inner wall, and a body positioned within the housing and separated therefrom so as to define an annular flow path between the body and the inner wall, the housing being rotationally stationary, and the body being rotatable relative to the housing about a rotational axis, the body comprising an impeller section having a first set of blades extending from the body into the annular flow path towards the inner wall of the housing, the impeller being rotatable for generating airflow through the apparatus and for generating swirl within the airflow, and a turbine section located downstream of the impeller section, the turbine section having a second set of blades for recapturing rotational energy from the airflow.

As a result, energy can be recaptured from the airflow by the turbine downstream of the impeller. This may result in a more energy efficient separator. In turn, this can improve battery life of battery powered devices that contain the apparatus for separating particles from an airflow.

The inner wall of the housing may be shaped to complement the shape of the body. As such, air is directed along a controlled pathway and air pressure is maintained along the length of the pathway.

The impeller section may be shaped such that the diameter of the annular flow path expands radially along the length of the impeller section of the body. This helps to maximise the effect of centrifugal force acting on the dirt particles within the airflow. The effect of centrifugal forces can be maximised for example by increasing the centrifugal force as well as reducing turbulence and also reducing pressure losses.

The impeller section of the body may be located in a dirty air portion of the apparatus, and the turbine section may be located in a clean air section of the apparatus. In this way, the impeller is able to increase the energy of the system within the dirty air portion of the apparatus in order to concentrate dirt particles within the air and thus reduce the amount of air that contains dirt particles. This provides a section of cleaned air that can be passed through the turbine in order to recover energy from the cleaned air, increasing the efficiency of the apparatus.

The apparatus may comprise a splitter located between the impeller section and turbine section to separate a dirty portion of the airflow containing an increased concentration of dirt from a clean portion of the airflow containing a reduced concentration of dirt. The splitter enables the clean and dirty portions of the airflow to more easily be handled differently downstream. The turbine section of the body may be located downstream of the splitter. If energy was recaptured from air that still contained dirt particles, then the apparatus would not be efficient with regard to dirt separation. Therefore by having the turbine section located downstream of the splitter, a more efficient apparatus can be achieved, as energy from the clean portion of air can be recaptured.

The body may be connected to a motor which drives rotation of the body. The motor may drive the body at between 80 and 120 krpm or more particularly between 90 and 100 krpm. Rotating the body with a motor that rotates at a high speed will result in larger centrifugal forces. This can further maximise the proportion of the total airflow that can become the clean air portion of airflow, and further increase the efficiency of the apparatus.

Rotation of the body by the motor may cause the impeller section to draw air into the apparatus at a flow rate of between 15 and 25 l/s, and more particularly at a flow rate of around 20 l/s. A flow rate of this magnitude provides a good level of separation performance for an apparatus for removing dirt from an airflow.

Within the apparatus, 100% of the airflow may pass through the annular flow path located along the impeller section of the body, and between 75% and 95% of the airflow may pass through the annular flow path located along the turbine section of the body. This allows energy to be recaptured from between 75% and 95% of the total airflow, thus providing an increase in efficiency for the apparatus.

The remaining 5 to 25% of the airflow may exit the apparatus prior to the turbine section of the body, and may be directed to a secondary separation apparatus. Accordingly, the dirty portion of airflow which contains the dirt particles can be directed towards another apparatus for removing the dirt particles from a reduced volume of airflow compared to the original total volume of airflow. Due to the reduced volume that the secondary separation apparatus is required to handle, it can be made smaller.

Furthermore a vacuum cleaner may comprise an apparatus separating particles from an airflow as described in any one of the preceding statements.

Also described herein is an apparatus for removing dirt from an airflow, the apparatus comprising an air inlet, an impeller for generating an airflow through the apparatus and for generating swirl within the airflow, the swirl throwing the dirt radially outwards and producing an outer dirty portion and an inner clean portion of airflow downstream from the impeller, and one or more splitters downstream of the impeller that bifurcate the airflow, separating the outer dirty portion from the inner clean portion.

As a result, the apparatus generates two separated portions of airflow that can be further processed appropriately in order to maximise the separation performance and energy efficiency. The dirty portion of airflow contains all the particles of dirt that were originally contained within the whole airflow, and so only a portion of the original airflow is required to be sent to a later separation stage in order to fully remove the dirt from the airflow. The clean portion of airflow that is generated by the apparatus does not does not need to be passed through any further separation stages, and so energy can be recaptured from this portion in order to improve energy efficiency of the apparatus.

The apparatus may further comprise first and second air outlets downstream of the one or more splitters. The separated dirty portion of airflow may pass through the first air outlet, and the separated clean portion of airflow passes through the second air outlet. This allows each separated portion of airflow to be handled differently more easily as required.

The first air outlet may direct airflow towards a downstream separation stage. The downstream separation stage may comprise one or more cyclone bodies arranged in parallel. By directing the first air outlet towards a downstream separation stage, the dirty portion of air will be passed through the downstream separation stage in order that the dirt particles can be removed from it. By providing the downstream separation stage with one or more cyclone bodies arranged in parallel, a high level of separation performance can be achieved.

The separated clean portion of airflow may be passed through a turbine. The turbine may be connected to the impeller. As a result, energy that is contained within the clean portion of airflow can be recaptured by the turbine. This increases the energy efficiency of the apparatus.

The separated dirty portion of airflow may comprise between 5% and 25% of the total airflow that enters the apparatus through the air inlet. By keeping the dirty portion of airflow as small as possible, the amount of air in the clean portion of airflow from which energy may be recaptured can be maximised. Also, the volume of air that is required to pass through a further downstream separation stage can be reduced. In turn this will decrease the amount of energy required by a downstream separation stage, and also may enable a downstream separation stage to be reduced in size.

The apparatus may further comprise a motor for rotating the impeller. The motor may drive the impeller at above 60 krpm, and preferably between 80 and 120 krpm, or more preferably between 90 and 100 krpm. Rotating the impeller with a motor that rotates at such a high speed will result in larger centrifugal forces. This can further maximise the volume of the resulting clean portion of airflow, and further increase the efficiency of the apparatus.

The airflow at the air inlet may be between 15 and 25 l/s. The airflow of the dirty portion of airflow may be between 0.75 and 6.25 l/s, and the airflow of the clean portion of airflow may be between 8.75 and 23.75 l/s.

When the airflow at the air inlet is substantially 20 l/s, the airflow of the dirty portion of airflow may be substantially 2 l/s, and the airflow of the clean portion of airflow may be substantially 18 l/s.

Also described herein is a vacuum cleaner that comprises an apparatus for removing dirt from an airflow as described in the preceding statements.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
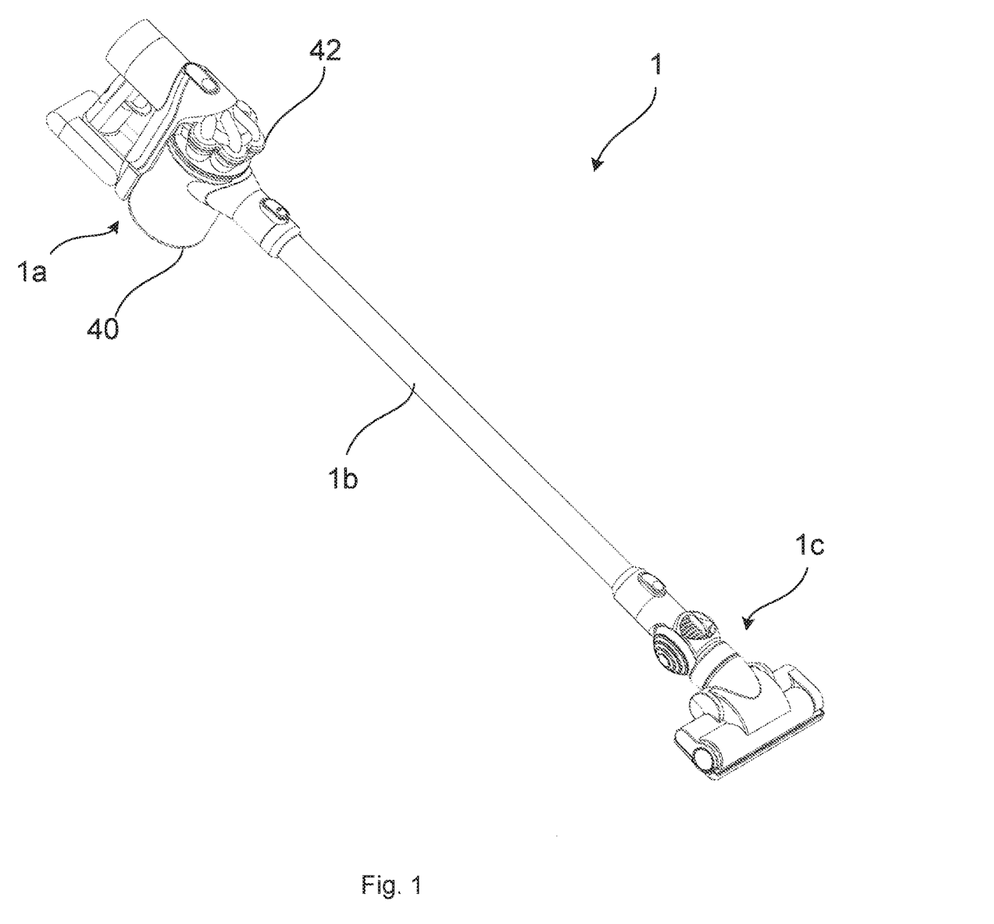
FIG. 1 is a vacuum cleaner.

FIG. 1 shows a stick vacuum cleaner 1. The stick vacuum cleaner 1 comprises a handheld vacuum cleaner 1a with a stick 1b and cleaner head 1c connected thereto. The vacuum cleaner 1 contains a separator (not shown) for removing dirt particles from an airflow as shall be described below.

Figure 2:
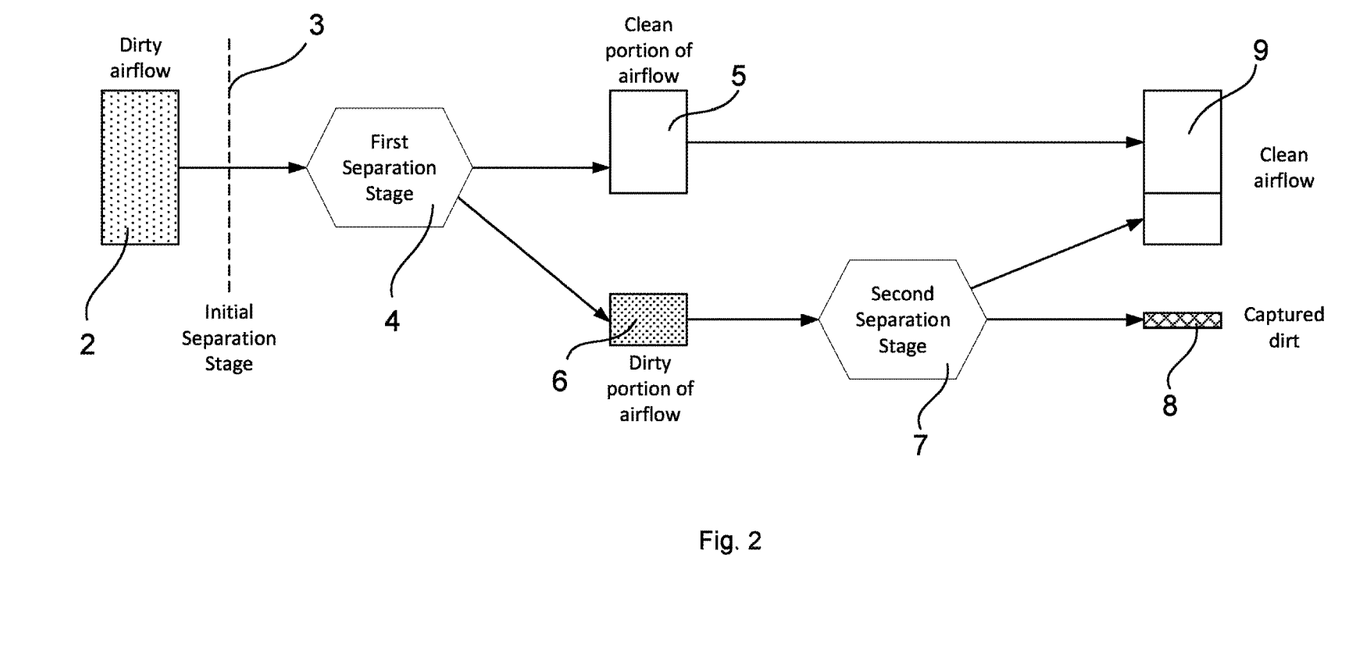
FIG. 2 is a flow diagram illustrating stages within a separator.

FIG. 2 is a flow diagram that schematically illustrates stages within a separator for removing dirt particles from an airflow. Such a separator may, for example, be included in a vacuum cleaner, and could be used in any style of vacuum cleaner such as a cylinder vacuum cleaner (sometimes referred to as a barrel vacuum cleaner), an upright vacuum cleaner, a handheld vacuum cleaner or an autonomous vacuum cleaner (often referred to as a robot vacuum cleaner). The vacuum cleaner may be mains or battery powered, however, the separator of the present invention is considered to be particularly beneficial when used in a battery powered vacuum cleaner.

At the start of the flow diagram, a volume of air is provided which contains dirt particles: the dirty airflow 2. The dirty airflow 2 is illustrative of a volume of air being drawn into the separator. The dirty airflow 2 first passes through an Initial Separation Stage 3. The purpose of the initial separation stage 3 is to remove relatively large particles of dirt and debris from the airflow that could block or clog up later separation stages that are configured to remove smaller particles of dirt. The initial separation stage 3 may be, for example, one or a combination of a simple mesh filter or a low efficiency cyclone chamber 40 or shroud.

After the dirty airflow 2 has passed through the initial separation stage 3, it enters the first separation stage 4. The first separation stage 4 acts to concentrate dirt particles within the dirty airflow 2, and two separated portions of airflow exit the first separation stage 4: a clean portion of airflow 5 and a dirty portion of airflow 6. All the dirt particles that were contained in the entire dirty airflow 2 are concentrated into the smaller dirty portion of airflow 6. The first separation stage 4 comprises an impeller which is rotated by a brushless DC motor at high speeds of above 60 krpm. It is particularly beneficial if the impeller is rotated by the motor at between 80 and 120 krpm, and even more so between 90 and 100 krpm. Whilst these ranges are particularly advantageous, alternative embodiments having a slower motor will still experience the same benefits, albeit at a reduced level. The impeller has two functions: to generate airflow through the separator, and also to generate swirl within the airflow such that the dirt particles within the dirty airflow 2 are subjected to centrifugal forces which concentrates the dirt particles into part of the airflow, leaving the remaining part free of dirt and dust particles. The part of the total dirty airflow 2 which contains the dirt particles then can be easily separated from the remainder of the airflow to produce the separate clean and dirty portions of airflow 5, 6.

The clean portion of airflow 5 that exits the first separation stage 4 does not require any further cleaning, and as such may simply exit the separator at that stage. The clean portion of air 5 may contain a considerable amount of energy that was put into the system by the impeller at the first separation stage. This energy can be recaptured in order to further increase the energy efficiency offered by the present separator. The energy may be recaptured from the clean portion of airflow 5 at any stage after the dirty portion of airflow has been separated from the overall airflow. This may be within the first separation stage, or downstream of the first separation stage prior to the clean portion of air exiting the separator. The energy in the clean portion of airflow 5 can be recaptured by a turbine, and this will be discussed in more detail below.

After exiting the first separation stage 4, the dirty portion of airflow 6 is directed towards a second separation stage 7. The second separation stage is configured to remove the smaller particles of dirt that were able to pass through the initial separation stage 3. For example, the second separation stage 7 may comprise one or more cyclone bodies 42 arranged in parallel.

As discussed previously, parallel cyclone bodies are well known for providing excellent dirt separation performance, but their use in existing vacuum cleaners can give rise to a number of drawbacks including multiple cyclone bodies increasing the size of the separator, and also reducing the energy efficiency. However, in the present separator, the volume of air that passes through the second separation stage has been considerably reduced compared to the total airflow entering the separator. As such, the number of cyclone bodies that are required to achieve the same or better separation performance can be substantially reduced. This allows the overall size of the separator to be reduced, which is desirable for any vacuum cleaner, but particularly important if the separator is used in a handheld vacuum cleaner or a robot vacuum cleaner. What is more, as air passes through fewer small cyclone bodies, less energy is required compared to a vacuum cleaner that has a large number of small cyclone bodies. Accordingly, the energy efficiency of a machine containing the separator can be increased, and in the case of a battery powered machine, the battery life can be extended.

Whilst the benefits of using one or more cyclone bodies in the second separation stage 7 are apparent, it will be understood that alternative embodiments may employ other forms of separation in the second separation stage 7 in place of, or in addition to, the cyclone bodies.

As shown in FIG. 2, the cyclone bodies in the second separation stage 7 remove the dirt from the dirty portion of airflow 6. The output of the second separation stage is therefore the captured dirt 8 and a second portion of clean airflow that exits the separator. The airflow exiting the second separation stage may or may not physically join up with the clean airflow that exits the clean portion of airflow 5 that exits the first separation stage 4. It will be understood that FIG. 2 merely schematically shows that the total clean airflow 9 is substantially equal to the volume of dirty airflow 2 that enters the separator.

Any amount of clean air that is generated by the first separation stage will provide a benefit to the overall separator, but it will be understood that the more the dirt particles can be concentrated into a smaller portion of dirty airflow within the first separation stage 4, the less volume of air is required to be processed through the second separation stage 7. This will of course increase the benefits in regards to the number of cyclone bodies required in the second separation stage 7, and also the energy required by the second separation stage. However, concentrating the particles more in the first separation stage will require more energy at the first separation stage. A balance must therefore be struck to achieve the optimum configuration to achieve the best results with regard to energy efficiency and performance. The present separator splits the airflow at the first separation stage 4 such that the volume of the dirty portion of airflow 6 is between 5% to 25% of the overall volume of the dirty airflow 2 entering the separator. A particularly advantageous embodiment will split the airflow to generate a dirty portion of airflow that has a volume that is between 10% to 15% of the overall volume of the dirty airflow 2. However, it will be appreciated that other levels of separation are achievable but that the resulting level of benefit will vary accordingly.

Figure 3:
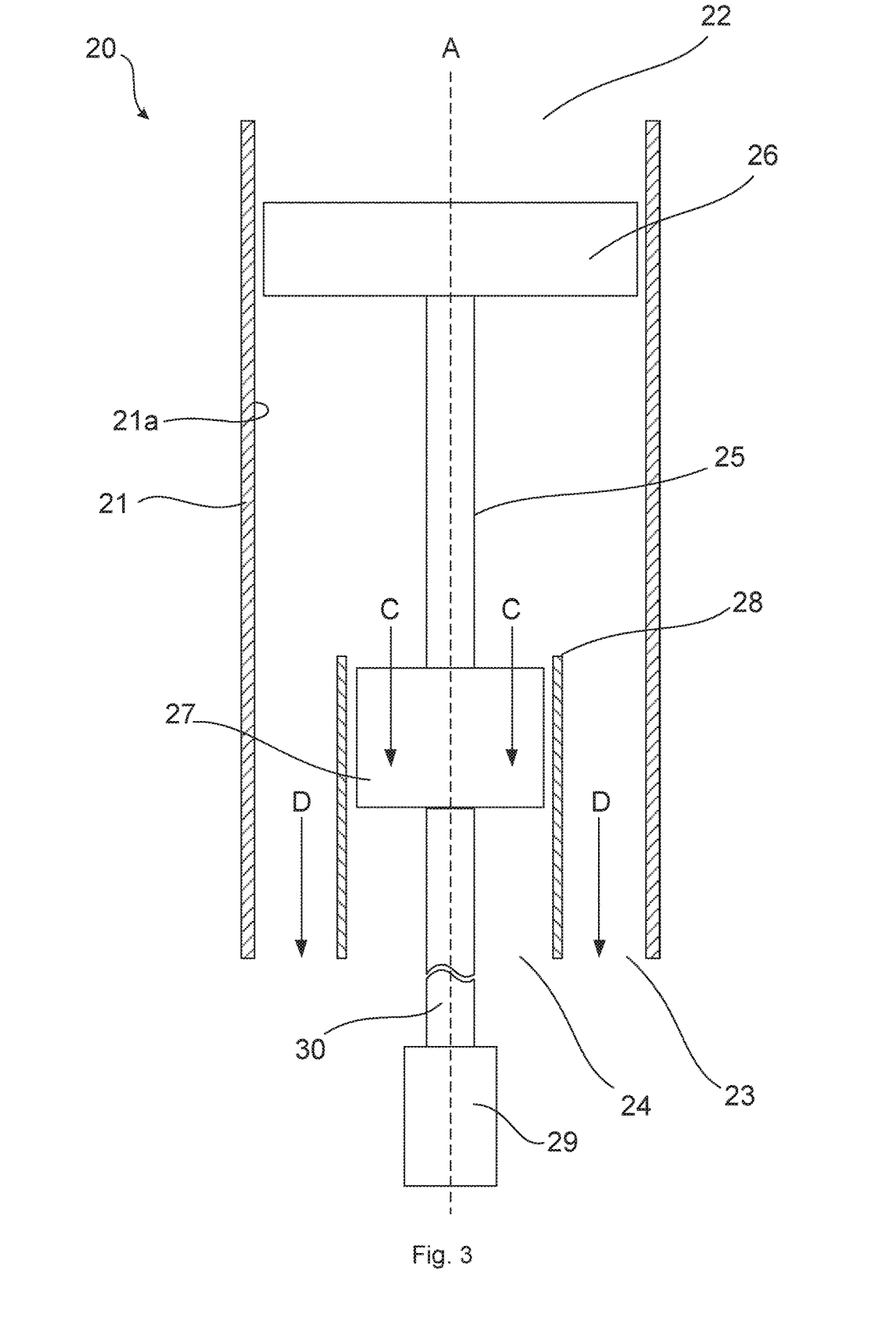
FIG. 3 is a schematic illustration of an apparatus for removing dirt from an airflow.

FIG. 3 is a schematic illustration of an apparatus 20 for removing dirt from an airflow. The apparatus 20 would typically be used within the first separation stage 4 of the separator described above with respect to FIG. 2. The apparatus 20 comprises a housing 21 having an inner wall 21a. At one end of the housing 21 there is an air inlet 22 and at the other end has a first air outlet 23 and a second air outlet 24. The air inlet 22 is at the upstream end of the housing 21 and the first and second air outlets 23, 24 are at the downstream end of the housing 21. A splitter 28 is provided within the housing 21 towards the downstream end which gives rise to the first and second outlets 23, 24.

A body 25 is positioned within the housing 21, and is rotatable about axis A which extends axially through the housing 21. An annular channel is formed between the body 25 and the inner wall 21a of the housing 21. The housing 21 and the body 25 are shown in FIG. 3 as axially straight, but in alternative embodiments may be shaped in order to optimise and increase the effect of centrifugal forces acting on the dirt particles. For example, by shaping the housing 21 and body 25, the centrifugal force may be increased, turbulence may be reduced, and pressure losses may be reduced. The body 25 comprises an impeller 26 at an upstream end of the body 25 nearest the air inlet 22, and the body 25 also comprises a turbine 27 at a downstream end. The exact positions of the impeller and turbine on the body can differ, but their relative positions must always be the same, with the impeller 26 upstream of the turbine 27. The impeller 26 and the turbine 27 may be positioned next to each other on the body 25. Indeed the impeller 26 and turbine 27 may form the body 25, such that there is no distinguishable separation between any of the parts. Both the impeller 26 and turbine 27 will be described further below. The body 25 is connected to a motor 29 by way of shaft 30. The location of the motor 29 could be changed. For example, in alternative embodiments, the motor 29 may be located upstream of the body 25, or even housed within the body 25. Locating the motor 29 downstream of the body, as shown in FIG. 3, is particularly beneficial as it can be cooled by the airflow that passes through the air outlet 24. However, it will be understood that other embodiments may have different benefits, for example if the motor is housed within the body 25 then the overall size of the apparatus 20 may be reduced.

The motor 29, which in this instance is a high speed brushless DC motor, spins the body 25 at around 60-110 krpm. Typically the motor 29 will spin at around 90-100 krpm during normal use. The impeller 26 will rotate with the body 25 and will generate an airflow that draws air into the apparatus 20 through air inlet 22. As the airflow passes through the impeller 26, the airflow is made to swirl around the inside of the housing 21 within the annular channel provided between the body 25 and inner wall 21a. The swirl generated by the impeller 26 imparts centrifugal forces to the airflow, and in particular to dirt particles that are entrained within the airflow. This has the result that dirt particles within the airflow are forced outwards towards the inner wall 21a of the housing 21 such that dirt particles are concentrated into a dirty portion of the airflow. The dirty portion of the airflow is located in the locality of the inner wall of the housing 21 and is positioned radially around a clean portion of airflow that is substantially emptied of dirt particles.

When the motor 29 drives rotation of the body 25 at high speeds the dirt particles entrained in the airflow are forced radially outwards by greater centrifugal forces and are therefore concentrated into a smaller portion of airflow. The dirty portion of air comprises between 5% and 25% of the overall volume of air entering the apparatus. The benefit of making the dirty portion of airflow as small as possible is that fewer cyclones will be required downstream of the apparatus 20 in a further separation stage (such as second separation stage 7 in FIG. 2). In addition, less energy will be required to remove the dirt particles from a smaller volume of air. However, the energy required to concentrate the dirt particles into a smaller volume will increase, so a balance must be reached, and a dirty portion of air that comprises between 10% and 15% of the overall volume of air entering the apparatus has been found to be particularly beneficial in this regard.

A splitter 28 is provided within the housing 21 that acts to physically separate the dirty portion of airflow from the clean portion of airflow. The arrows labelled C represent the clean portion of airflow, and the arrows labelled D represent the dirty portion of airflow. The dirty portion of airflow D is located radially around the outside of the clean portion of airflow C due to the effect of centrifugal forces acting on the dirt particles within the airflow which causes them to migrate towards the inner wall 21a of the housing 21. The splitter 28 separates the two portions of airflow by introducing a barrier between them. The location and dimensions of the splitter 28 will act to split the overall airflow into the desired proportions. For example, if the splitter 28 has dimensions such that it is provided close to the inner wall 21, then a relatively small proportion of the overall airflow will exit the housing 21 through the first outlet 23 and a larger proportion will exit through the second outlet. In this instance, the dirty portion of air D will be smaller than the clean portion of air C. As has already been explained above, this is desirable, and the dirty portion of air comprises a volume that is between 5% and 25%, and even more advantageously between 10% and 15%, of the overall volume of air that enters the apparatus 20 through the inlet 22.

Whilst the embodiment of FIG. 3 shows the apparatus having one splitter 28, it will be understood that more than one splitter may be provided that separates off a number of different fractions of the dirty portion of airflow at different stages within the apparatus 20. Indeed, multiple splitters may be provided, or even a mesh provided along a section of the inner wall 21a of the housing 21 which separates the dirty portion of airflow from the clean portion.

The impeller 26 can be any style impeller that can generate an airflow through the apparatus and swirl within that airflow. For example, the impeller may be axial, radial or a mixed flow impeller.

The turbine 27 is located downstream of where the splitter 28 separates the two portions of airflow. Both the dirty and clean portions of airflow downstream of the splitter still contain a large amount of the energy that was introduced by the impeller 26. This energy is useful in the dirty portion of airflow D as it can be used downstream of the apparatus 20 in a further separation stage in order to remove the dirt from the relatively small amount of air that remains. However, the residual energy contained within the clean portion of airflow can be recaptured by the turbine 27. As the clean portion of airflow C passes through the turbine which is connected to the body 25, the swirl energy within the airflow results in a rotational force being transferred from the clean portion of airflow C to the blades with the turbine 27. As such, less energy is required from the motor in order to rotate the body 25. This increases the energy efficiency of the apparatus 20.

Bifurcation of the airflow by the splitter allows energy that is contained within the clean portion of airflow to be recaptured and not wasted. The energy contained within the dirty portion of airflow can be used in a downstream separation stage to remove the dirt particles from the dirty portion of airflow. The bifurcation therefore provides a significant increase in the energy efficiency of the apparatus and a separator that comprises the apparatus. For example, if the motor rotates the impeller at a speed to generate an airflow of 20 l/s, and the splitter 28 separates the airflow in a 1:9 split, then 90% of the airflow will be clean. Only 10% of the overall airflow, just 2 l/s, will need to pass through a downstream separation stage to remove the dirt completely. The remaining 18 l/s can be passed through the turbine in order to recapture energy from that clean portion of airflow.

Whilst particular embodiments have thus far been described, it will be understood that various modifications may be made without departing from the scope of the invention.

The invention claimed is:

1. A vacuum cleaner comprising separator for removing dirt particles from an airflow, the separator comprising:
   a first separation stage having an impeller; and
   a second separation stage having one or more cyclone bodies arranged in parallel,
   wherein the first separation stage is upstream of the second separation stage, the impeller generates the airflow through the separator and generates swirl within the airflow in the first separation stage, the swirl throws the dirt particles radially outwards to produce an outer dirty portion and an inner clean portion of airflow, the dirty portion of airflow passes through the second separation stage, and the clean portion of airflow bypasses the second separation stage, and wherein airflow exiting the second separation stage flows downstream of the first and second separation stages to an outlet from the separator.

2. The vacuum cleaner of claim 1, wherein the first separation stage comprises a first outlet and a second outlet, the dirty portion of airflow exits the first separation stage via the first outlet and the clean portion of airflow exits the first separation stage via the second outlet.

3. The vacuum cleaner of claim 1, wherein the clean portion of airflow is free from at least 95% of all the dirt particles that enter the separator.

4. The vacuum cleaner of claim 1, wherein the dirty portion of airflow comprises between 5% and 25% of the total airflow that enters the separator, and the clean portion of airflow comprises between 75% and 95% of the total airflow that enters the separator.

5. The vacuum cleaner of claim 1, wherein the separator comprises an initial separation stage upstream of the first separation stage, the initial separation stage removing larger dirt particles and debris from the airflow.

6. The vacuum cleaner of claim 5, wherein the initial separation stage comprises a cyclone chamber through which the airflow passes before proceeding to the first separation stage.

7. The vacuum cleaner of claim 1, wherein the first separation stage comprises a motor for driving the impeller.

8. The vacuum cleaner of claim 7, wherein the motor rotates the impeller at speeds above 60 krpm.

9. A method of removing dirt particles from an airflow, the method comprising:
in a first separation stage of a separator of a vacuum cleaner, using an impeller to generate the airflow and swirl within the airflow, the swirl throwing the dirt particles radially outwards to produce an outer dirty portion and an inner clean portion of airflow;
passing the dirty portion of airflow through a second separation stage of the separator, the second separation stage having one or more cyclone bodies arranged in parallel; and
the clean portion of airflow bypassing the second separation stage,
wherein airflow exiting the second separation stage flows downstream of the first and second separation stages to an outlet from the separator.

10. The method of claim 9, further comprising splitting the dirty portion of airflow from the clean portion of airflow in the first separation stage downstream of the impeller.

11. The method of claim 9, wherein the clean portion of airflow is passed through a turbine section to recapture energy from the clean portion of airflow.

12. The method of claim 9, comprising driving the impeller at above 60 krpm using a motor.

13. The method of claim 9, wherein the method further comprises passing the airflow through an initial separation stage upstream of the first separation stage to remove larger dirt particles and debris from the airflow.

* * * * *